INVENTOR
ARTHUR W. SEAR

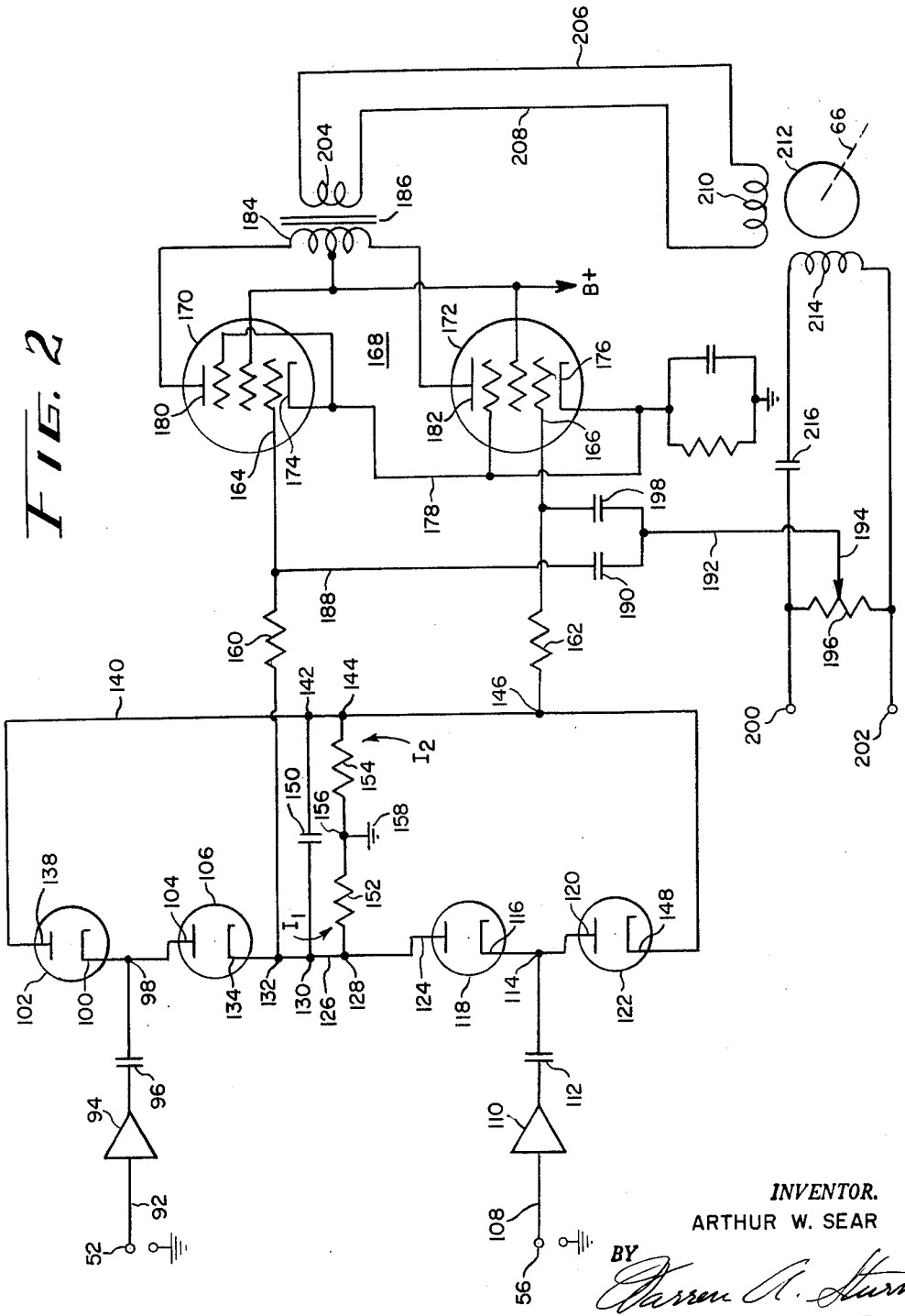

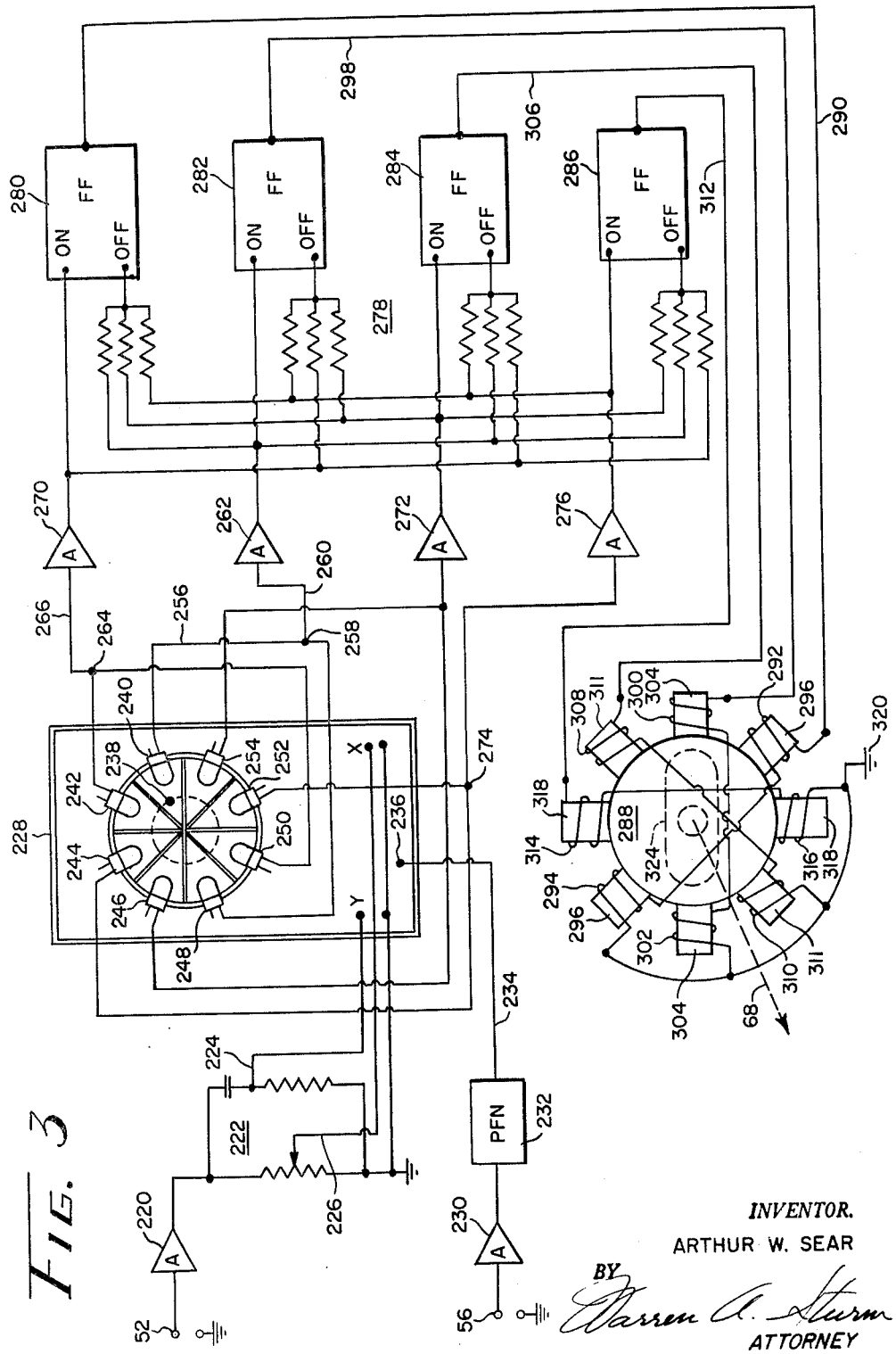

United States Patent Office 3,218,538
Patented Nov. 16, 1965

3,218,538
SPEED CONTROL APPARATUS
Arthur W. Sear, Arcadia, Calif., assignor to Minneapolis-Honeywell Regulator Company, Minneapolis, Minn., a corporation of Delaware
Filed June 7, 1960, Ser. No. 34,591
13 Claims. (Cl. 318—314)

The present invention relates generally to electromechanical control systems, and more particularly to a system for controlling the rotational velocity of an output shaft which is adapted to be connected to a suitable load or utilization device.

There exists many practical applications for a system which will maintain the speed of a shaft at a predetermined desired speed. As one example, in power generating plants, the magnitude and/or frequency of the voltage generated is often dependent upon the speed at which a generator is being driven. If it is desired to maintain the magnitude of the voltage or the frequency of the output from a generator constant, it becomes necessary to maintain the speed of the prime mover driving the generator constant at some predetermined value. Also, in many machine control applications it is necessary to provide means for continuously varying the desired speed of a load member over a wide range.

The present invention provides a novel arrangement by which a variable speed motor may be used for driving a load. Accordingly, one of the objects of the present invention is to provide a novel arrangement for driving a variable speed motor at a predetermined speed with an extremely high degree of precision over a wide range of desired speed.

The above object is accomplished in part by comparing a signal proportional to the desired speed with a signal proportional to the actual speed of the controlled member in such a manner as to develop an error signal for making adjustments in the speed of the motor driving the controlled member. The comparison of these two signals gives rise to a voltage proportional to the instantaneous difference in motor speed from the desired speed. This voltage is employed in a novel manner to vary the rotational speed of the motor driving the output shaft.

It is therefore still another object of the present invention to provide a novel arrangement for obtaining a control voltage which is proportional to the instantaneous error in the speed of the drive motor, and employing this voltage to reduce this error to zero.

Control systems can, in general, be classified either as open loop systems or as closed loop systems, depending upon the absence or presence, respectively, of a comparison of the value of some function of the quantity being controlled with the reference or desired value of the control variables. In an open loop system, the amount of corrective effort is determined for a given mechanism by the value of the reference quantity and is in no way affected by the value of the controlled variable. In a closed loop servo system the actual output, or some function thereof, is compared with the input, and the difference between the two is used to modify the output.

Basically, the operation of the speed control system of this invention is as follows:

The desired speed is first set into the control system by setting a precision oscillator to the particular frequency that corresponds directly to the desired speed. As the desired speed is set into the system, an open loop servomechanism is effective to position the friction drive member of a ball-disc variable speed drive device to a position that causes the output shaft to assume, quite closely, the desired speed. In order to provide a vernier or fine control over the output shaft speed, the system of this invention incorporates a closed loop servomechanism. If the actual speed of the output shaft is exactly the desired speed, then the frequency of a signal generated by a photoelectric pickup, associated with a tone wheel on the output shaft, matches exactly the frequency of the signal from the above mentioned precision oscillator. Any difference in frequencies in these two signals is detected by frequency and phase comparator circuitry. The frequency and phase comparator is effective to develop an error signal which is applied to a suitable driving means for adjusting the frequency of a power oscillator. The power oscillator, in turn, furnishes power to a synchronous motor which indirectly drives the output shaft through suitable differential gearing means.

It is therefore still another object of the present invention to provide in a speed control servo system the combination of an open loop and a closed loop feedback arrangement for obtaining a continuously variable speed control over a wide range of desired speed.

Other objects and advantages will become apparent from the following detailed description taken in connection with the accompanying drawings, in which:

FIG. 2 is a circuit diagram of one form of a frequency comparator suitable for use in the system of FIG. 1, and FIG. 3 is a circuit diagram of an exemplary embodiment of a phase comparator circuit which may be used along with the frequency comparator circuit in FIG. 2 in the system of FIG. 1.

Figure 1:
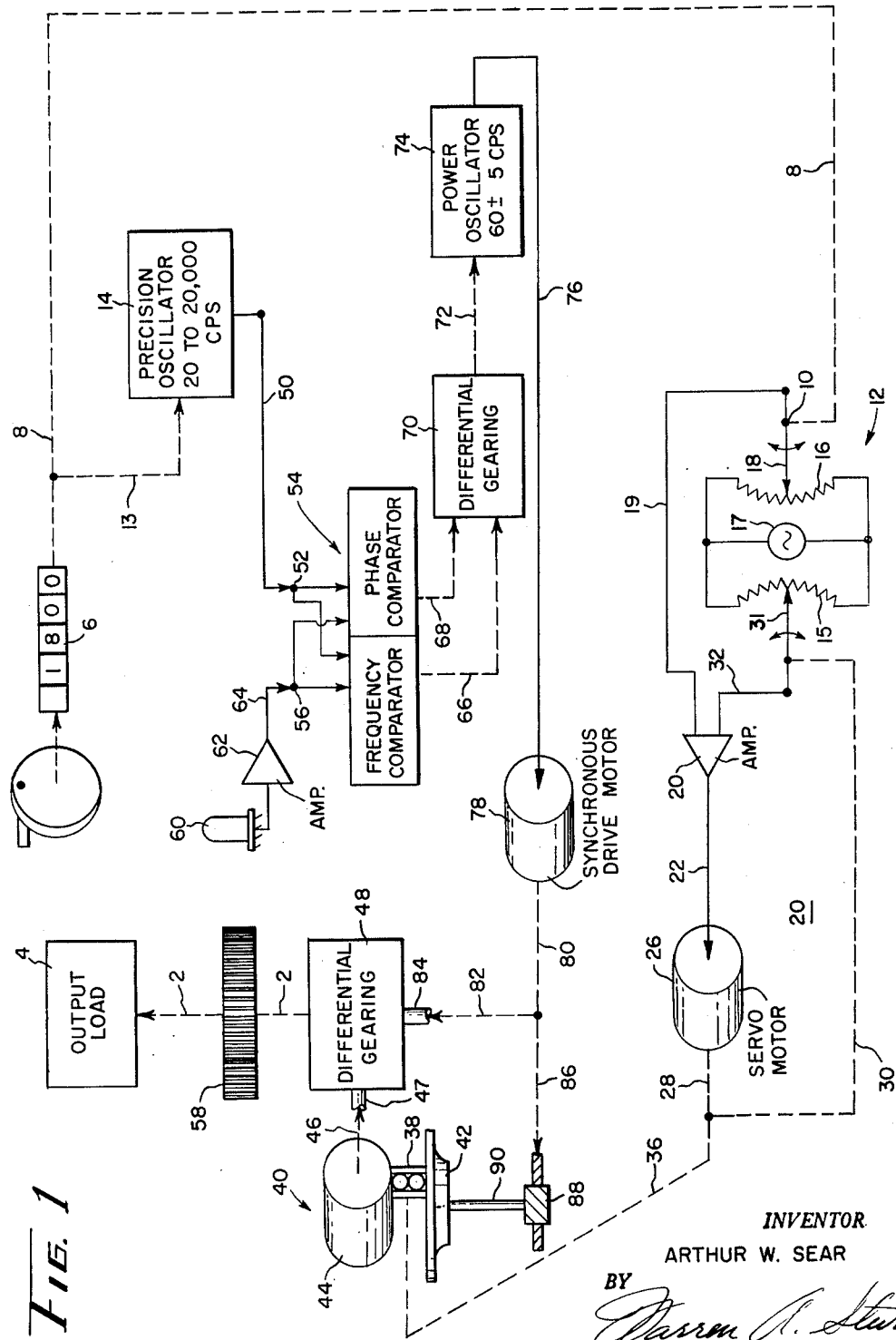
FIG. 1 is a block diagram of the speed control system of this invention.

While the invention is susceptible of numerous modifications and alternative constructions, it is herein shown and will hereinafter be described in a single embodiment. It is not intended, however, that the invention is to be limited thereby to the specific disclosure made. On the contrary, it is intended to cover all modifications and alternative constructions falling within the spirit and scope of the invention as defined in the appended claims.

In the block diagram of FIG. 1 of the drawings, mechanical connections between the various components are represented by dashed lines whereas electrical connections are represented by solid lines. In tracing through the open loop of the system of FIG. 1, the desired speed of the output shaft 2, which may be used to drive an output load 4, is entered into a mechanical counter arrangement 6 by the operator. The counter 6 may be replaced by a suitable dial arrangement calibrated in shaft speed in inches per second or some other convenient unit of speed so that limitation to a counter is not intended. The counter 6 is connected through a mechanical linkage 8 to a first input 10 of a differential type comparator 12 and through a linkage 13 to the frequency adjusting control of a precision oscillator 14. Comparator 12 is designed to produce an electrical signal proportional to the angular displacement between two shafts and, as such, may conveniently take the form of a Wheatstone bridge comprised of a pair of potentiometers 15 and 16 supplied from a source of energy 17. The wiper arm 18 of potentiometer 16 is mechanically connected to the counter device 6 through linkage 8 as stated and electrically connected by a conductor 19 to a signal amplifying means 20. The output from amplifier 20 is applied over conductor 22 to one phase of an alternating current servo motor 26, the other phase of which is supplied by a source of voltage (not shown) which may be considered as a reference. The output shaft 28 of the servo motor 26 is coupled through mechanical linkages, represented by dash line 30, to the wiper arm 31 of the potentiometer 15. Wiper arm 31 is also electrically connected through a conductor 32 to the input of the amplifier 20. When the bridge is balanced, indicating positional correspondence between the wiper arms 18 and 31, no signal is applied to amplifier 20 and, hence, the shaft 28 of motor 26 is stationary. However, when a change is made in the desired speed, such that the poistion of wiper arm 18 is changed, the bridge is in an unbalanced condition and an amplified signal is applied to the motor 26 causing its shaft 28 to rotate. This rotation is coupled back through linkage 30 to the wiper arm 31 of potentiometer 15 and is effective to cause a rebalance of the bridge.

The output shaft 28 of the servo motor 26 is also connected by means of a linkage 36 to the friction drive member 38 of a ball-disc variable speed drive mechanism, indicated generally by the number 40. Device 40 also includes a driving disc 42 and a driven cylinder 44. The speed at which member 44 rotates is dependent both on the rotational speed of driving disc 42 and the position of the friction drive member 38 with respect to the axis of rotation of disc 42. The driven cylinder 44 is connected by means of a shaft 46 to one input shaft 47 of a differential gearing mechanism 48 having its output driving shaft 2.

It may be observed that the speed control path described above is of the open loop type since there is no comparison of the value of the actual speed of the output shaft 2 with the reference or desired value, as entered into the counter 6.

In tracing through the closed loop feedback path, a variable frequency precision oscillator 14 which is preferably stable over a wide range of temperature changes, is set to oscillate at a frequency proportional to the desired speed entered on the counter 6, through the use of the mechanical linkage 13 connecting said counter to the precision oscillator. The output signal from the oscillator appearing on line 50 is applied to the reference input terminal 52 of a frequency and phase comparator 54. The signal applied to terminal 52 is compared in comparator 54 to a signal proportional to the actual speed of the output shaft 2, which is applied to a second terminal 56 of comparator 54.

The means for generating signals proportional to the actual speed of shaft is shown in FIGURE 1 as being comprised of a tone wheel 58 driven by shaft 2 having an optical sound track recorded on its periphery which is illuminated by a bar filament lamp focused thereon. A photoelectric cell 60 is used to pick up the light variations, and the resulting current is amplified, if necessary, by means of amplifier 62, and applied to the input terminal 56 by means of conductor 64. It is perhaps obvious that other means may be used for producing a signal of a frequency proportional to the actual speed of the output shaft 2. For example, the tone wheel 58 may be replaced by a disc made from a magnetic material having a plurality of teeth equally spaced along its periphery. A magnetic transducing head may then be used to develop an alternating voltage as the teeth pass through the magnetic field produced by the head. Also, the tone wheel 58 may be geared directly to the output shaft 2 or mechanically connected in any suitable manner to the output shaft.

As will be described more fully hereinbelow, the mechanical output from the comparator 54 is in the form of a rotation of the shafts 66 and 68. The angle of rotation of shaft 66 is proportional to the instantaneous differences in frequency between the voltages applied to terminals 52 and 56, whereas the angle of rotation of shaft 68 is proportional to the phase difference between these two voltages. The rotation of these two shafts are combined in a suitable differential gearing mechanism 70. The output shaft 72 of mechanism 70 is mechanically coupled to a variable frequenecy power oscillator 74, and is effective to vary the frequency of said oscillator in response to the combined rotation of shafts 66 and 68. The power oscillator 74 is used to supply electrical energy over line 76 to a synchronous drive motor 78. Oscillator 74 may comprise a variable frequency oscillator and a power amplifier. The output shaft 80 of motor 78 is mechanically coupled through a suitable linkage 82 to another input shaft 84 of the differential gearing mechanism 48. Shaft 80 is also connected by means of a linkage 86 and a suitable gear train 88 to the drive shaft 90 of the driving disc 42.

It may be observed that the feedback path just traced is closed through the tone wheel 58 since a comparison of the actual speed is made with the reference or desired speed and the difference is used to modify the actual speed such that it tends to become equal to the desired speed.

Since all of the components, other than the frequency and phase comparator 54, used in the system of FIGURE 1 are well known in the art, it is felt unnecessary to describe them in detail. It is felt, however, that a description of the frequency and phase comparator will aid in a clearer understanding of the system operation.

*Frequency comparator*

In FIGURE 2 there is shown one form of a frequency comparator which may be employed in the speed control servo system of FIGURE 1. The terminal 52, which as shown in FIGURE 1 is the reference input terminal to which the signals from the precision oscillator are applied, is connected through a conductor 92 to the input terminal of an amplifier-limiter circuit 94. The output signals from the circuit 94 are applied through a capacitor 96 to a junction 98 between cathode electrode 100 of a diode 102 and the plate electrode 104 of a diode 106. The terminal 56, which in the system diagram of FIGURE 1 is shown as being connected to the tone wheel phototube pickup device, is connected by means of a conductor 108 to an amplifier-limiter circuit 110, which may be identical in construction to circuit 94. The output from circuit 110 is connected through a capacitor 112 to a junction 114 between the cathode electrode 116 of a diode 118 and the plate electrode 120 of a diode 122. The plate electrode 124 of diode 118 is connected through the junctions 128, 130 and 132 to the cathode electrode 134 of diode 106 by means of a conductor 126. The plate electrode 138 of diode 102 is connected through the junctions 142, 144, and 146 to the cathode electrode 148 of diode 122 by means of the conductor 140. A capacitor 150 is connected directly between the junction 130 on conductor 126 and the junction 142 on conductor 140. Also, a pair of resistors 152 and 154 are connected to series between the junction 128 on conductor 126 and the junction 144 on conductor 140. The common junction 156 between resistors 152 and 154 is connected to a point of fixed potentials such as ground 158. The circuitry thus far described comprises a pair of voltage doubler circuits connected in a back-to-back relationship.

The output voltages from the pair of voltage doublers are applied through resistors 160 and 162 to the control electrodes 164 and 166 of a balanced modulator, indicated generally by the numeral 168. Balanced modulator 168 includes a pair of vacuum tubes 170 and 172 having their cathode electrodes 174 and 176 connected in common by means of a conductor 178. The plate electrodes 180 and 182 of tubes 170 and 172 respectively are connected to the opposite ends of the primary winding 184 of an output transformer 186. Control electrode 164 of tube 170 is connected by means of a conductor 188, a capacitor 190, and another conductor 192 to the wiper arm 194 of a potentiometer 196. Likewise, the control grid 166 of tube 172 is connected through a capacitor 198 and conductor 192 to the potentiometer wiper arm 194. Potentiometer 196 is connected directly across a pair of terminals 200 and 202 which are adapted to be connected to a source of alternating current voltage. As a result, the control grids of the modulator tubes 170 and 172 are driven in phase from the alternating current power source. The secondary winding 204 of output transformer 186 is connected by means of conductors 206 and 208 to the opposite ends of a first winding 210 of a two-phase induction type serve motor 212. The other phase winding 214 of motor 212 is connnected through a capacitor 216 directly across the alternating current input terminals 200 and 202.

In operation, the signals from the precision oscillator are applied to the input terminal 52 and are amplified and limited by the circuit 94, such that the signals appearing at the output of circuit 94 are square wave in form having a constant amplitude E and a frequency equal to the frequency of the signals from the precision oscillator. Similarly, the signals from the tone wheel pickup are applied to the input terminals 56 and are amplified and limited by circuit 110. The signals appearing at the output of the circuit 110 are also square wave in form having a constant amplitude E, but of a frequency proportional to the actual speed of the output shaft. As these two square wave signals are applied to capacitors 96 and 112, these capacitors will be alternately charged and discharged through the diode rectifiers to provide the average current $I_1$ or $I_2$. If the capacitors 96 and 112 are small enough to be completely charged during the time the square wave pulses are applied and the applied pulse has a constant voltage E, the quantity of electricity stored will be equal to $Q=EC$. During one-half cycle the capacitors 96 and 112 are charged to the maximum value of the supply voltage. During the next half-cycle both the charge accumulated on the capacitor and the supply voltage are used in series to charge a second capacitor 150. It can be seen that the rectified current $I_1$ will be equal to $ECN_1$ where $N_1$ is the number of pulses per second appearing at the output of the precision oscillator. Similarly, the rectified current $I_2$ will be equal to $ECN_2$, where $N_2$ is equal to the number of pulses per second obtained at the output of the limiter circuit 110. The voltage developed across resistors 152 and 154 is therefore proportional to the difference frequency of the two signals applied to the input terminals 52 and 56, respectively. The polarity of the voltage developed across these two resistors reverses as the frequency of one of the signals approaches and passes the frequency of the other signal.

The signals developed across resistors 152 and 154 are applied through resistors 160 and 162, respectively, to the control grids 164 and 166 of the tubes 170 and 172 located in the balanced modulator circuit 168. The control grids of the modulator tubes 170 and 172 are driven in phase from the alternating current power source connected across potentiometer 196 through the coupling capacitors 190 and 198 connected to the wiper arm 194 of potentiometer 196. The plate electrodes 180 and 182, however, are connected to opposite ends of the output transformer primary winding 184 in phase opposition, such that if the bias voltages applied to the control grids 164 and 166 are equal, no output signal will be induced in the secondary winding 204 of transformer 186. The alternating current output voltage of the modulator stage 168 is proportional in amplitude to the difference in the bias voltages on the control grids of the two tubes and reverses in phase as the frequency difference of the signals applied to terminals 52 and 56 passes through zero.

The two phase inducton motor, commonly used in control applications, is represented as shown in FIGURE 2. The stator is wound with two similar windings distributed in slots and having their magnetic axes perpendicular to one another. The rotor may be either a wire-wound coil short circuited upon itself or a "squirrel cage" structure. The two stators windings 210 and 214 are normally excited by two alternating voltages of the same frequency in time quadrature with one another. The resulting magnetic field, therefore, rotates through one complete revolution for each cycle of the applied voltage (in a two-pole machine). A reversal of the direction of rotation can be obtained by reversing the phase of either of the two stator winding voltages. In automatic control system applications, however, the common practice is to excite one stator winding from a constant magnitude alternating voltage source, and to excite the second winding with a control signal. Winding 214 may therefore be considered as a reference winding, whereas winding 210 may be considered as being the control winding. The capacitor 216 is included in series with the reference winding 214 in order to provide a 90° phase shift to insure that the magnetic field produced by the two stator windings are in quadrature.

If the signal applied to the input terminals 52 is higher in frequency than the signal applied to terminal 56, the rectified current $I_1$ will be greater than current $I_2$ and, hence, the bias applied to the control grid 164 of tube 170 will be more positive than the bias voltage applied to the control grid 166 of tube 172. As a result, there will be induced in secondary winding 204 of transformer 186 a signal which, when applied to the control winding 210, is effective to cause the rotor to rotate in a first direction. However, when the frequency of the signals applied to a terminal 56 exceeds that of the signals applied to the input terminal 52, the rectified current $I_2$ will exceed $I_1$ and, hence, a more positive bias will be applied to the control electrode 166 of tube 172 than is applied to the control electrode 164 of tube 170. Under these circumstances, the signal induced in secondary winding 204 will be opposite in phase to that previously considered and, when applied to the control winding 210 of the servo motor 212, is effective to cause its rotor to rotate in the opposite direction. Finally, when the frequencies of the two signals applied to terminals 52 and 56 respectively are equal, equal bias voltages will be applied to the control electrodes 164 and 166 and, hence, a zero net voltage will be induced in the secondary winding 204 of transformer 186. The motor of the servo motor 212 will therefore remain stationary.

As the frequencies of the two signals approach each other, within a few cycles per second, the effectiveness of this type of frequency comparison system decreases rapidly. Stated somewhat differently, the frequency comparison system of FIGURE 2 loses sensitivity at the balance point. For this reason, use is made of a phase comparator circuit arranged to assume control when sensitivity of the frequency comparator is low.

*Phase comparator*

FIGURE 3 illustrates schematically one possible phase comparator device suitable for use in the speed control servo system of FIGURE 1. The output signal from the precision oscillator 14 is applied to the input terminal 52 of the phase comparator circuit. If necessary, a stage of amplification 220 may be included to amplify this signal to a value suitable for use with the phase comparator. The output from amplifier 220 is applied to the input terminal of a phase splitting network identified generally by the numeral 222. The phase splitting network is designed such that the signal appearing on line 224 is 90° out of phase with respect to the signal appearing on line 226. Many circuits are available for providing this 90° phase difference and limitation to this particular form is not intended. Line 224 is connected to the vertical deflection plates of a cathode ray oscilloscope 228. Similarly, line 226 is connected to the horizontal deflection plates of this oscilloscope. As is well known in the art, the application of signals 90° out of phase to the horizontal and vertical deflection plates of an oscilloscope is effective to produce a circular trace on the display tube thereof.

The output signal from the phototube 60 associated with the tone wheel 58 (see FIG. 1) is applied to the input terminal 56 of the phase comparator. If necessary, this signal may also be amplified in an amplifier 230. The output from the amplifier 230 is fed to a suitable pulse forming network 232, which is effective to produce a series of short pulses having the same frequency as the signals applied thereto. Such circuits are relatively well known in the art and it is felt that the detailed description of such a circuit is unnecessary. The output from the pulse forming network is applied over conductor 234 to the intensity control grid terminal 236 of the oscilloscope 228. When a pulse is applied to the intensity control grid of the oscilloscope, a visible spot, such as spot 238, appears on the face of the scope during the interval that the pulse is being applied. As the phase angle between the signal applied to terminal 52 and the signal applied to terminal 56 changes, the spot 238 appears to progress around the face of the scope in a circular path. A plurality of phototubes 240 through 254 are symmetrically arranged about the face of the cathode ray tube, such that as the spot 238 progresses through its circular path, its light is effective to activate these phototubes successively. If necessary, a suitable mask, adapted to be connected to the face of the cathode ray tube, may be included to prevent the light spot 238 from affecting more than one phototube at a time. Alternatively, instead of an ordinary cathode ray tube and photoelectric sensing tubes, a specially designed tube may be constructed that would provide a circular scan as well as a plurality of electrodes arranged to intercept the electron beam and thus directly generate the stepping signals.

As shown in FIG. 3, diametrically opposing phototubes are connected in common to the input of an amplifier. More specifically, phototube 240 is connected by means of a conductor 256 to phototube 248 and to a common junction 258. Junction 258 is connected by means of conductor 260 to an amplifier 262. Similarly, phototubes 242 and 250 are connected to a common junction 264 which, in turn, is connected by means of conductor 266 to amplifier 270. Phototubes 246 and 254 are connected together so as to provide an input to amplifier 272 and phototubes 244 and 252 are connected together at junction 274 so as to provide an input signal to amplifier 276.

The outputs from amplifiers 270, 262, 272, and 276 are fed through a suitable resistive distribution network indicated generally by the numeral 278 to the input terminals of a plurality of bistable flip-flops. A signal appearing on the output line of amplifier 270 is effective to turn on flip-flop 280 and to turn off flip-flops 282, 284 and 286. Likewise, a signal on the output line from amplifier 260 is effective to turn on flip-flop 282 and to turn off flip-flops 280, 284 and 286.

Flip-flops 280 through 286 are of the type wherein the "on" state is defined by a substantial positive potential with respect to ground, whereas the "off" state is defined as ground potential. The outputs from these flip-flops are applied to separate stator windings on a direct current stepper motor indicated generally by the numeral 288. In this respect, the output from flip-flop 280 is connected by means of a conductor 290 to the coils 292 and 294 which are associated with the pair of poles 296 of stepper motor 288. The output from flip-flop 282 is applied by means of conductor 298 to the coils 300 and 302 associated with the pair of poles 304. Similarly, conductor 306 connects the output from flip-flop 284 to the coils 308 and 310 of motor 288. Finally, conductor 312 connects the output of flip-flop 286 to the coils 314 and 316 which are wound on the poles 318 of stepper motor 288. The coils 294, 302, 310 and 316 have one end thereof connected in common to a point of fixed potential, here shown as ground 320. The output shaft 68, which is connected to the rotor 324 of stepper motor 288, is preferably connected to one input shaft of a suitable differential gearing mechanism 70 (FIG. 1). The other input shaft of this differential gearing mechanism is connected to the output shaft 66 of the two phase servo motor 214 of FIG. 2. The output shaft 72 of this differential gearing mechanism, which rotates as a function of the rotation of its two input shafts, is used to vary the frequency of the power oscillator 74.

The phase comparator of FIG. 3 operates as hereinafter described. The output from the precision oscillator is applied to the input terminal 52, amplified if necessary by amplifier 220, and applied to a suitable phase splitting network 222. Phase splitter 222 provides a 90° phase shift between the output appearing on conductor 224 and that appearing on conductor 226. Since conductor 224 is connected to the vertical deflection plates of the cathode ray oscilloscope 228 whereas the conductor 226 is connected to the horizontal deflection plates, the resulting trace appearing on the face of the oscilloscope during the period of intensification is circular. The signal from the phototube pickup 60 associated with the tone wheel 58 is applied to the input terminal 56 of the phase comparator, amplified if necessary by amplifier 230, shaped by pulse forming network 232, and applied over conductor 234 to the intensity control electrode 236 of the cathode ray oscilloscope 228. If the signals applied to the input terminals 52 and 56 are exactly in phase, the resulting spot 238 on the face of the cathode ray tube will appear to be stationary. However, if there is a phase difference between these two signals, the spot 238, appearing during the interval in which a pulse is being applied to the intensity control electrode 236, will appear to drift in a circular path. As this light spot rotates, the phototubes 240 through 254, cooperating with the face of the cathode ray tube, will be energized in a sequential fashion. When phototube 242 or 250 is energized by the spot 238 a signal is applied over conductor 266, amplified by amplifier 270 and used to trigger the flip-flop 280 to its "on" condition. The amplified signal from amplifier 270 is applied to the "off" input terminal of the flip-flops 282, 284, and 286. Flip-flop 280 is therefore the only one whose output is at a substantially positive potential with respect to ground. A current therefore flows through conductor 290, through coils 292 and coil 294 of stepper motor 288 to ground 320. The rotor 324 of the stepper motor 288 will therefore align itself with the energized magnetic poles 296.

As the spot 238 continues to rotate in a clockwise direction, it soon enters into the area associated with phototube 240 such that a signal is applied through conductors 256 and 260 to the input terminal of amplifier 262. This signal is amplified and applied to the "on" terminal of flip-flop 282. At the same time this same signal is applied to the "off" terminals of the flip-flops 280, 284 and 286. Current therefore flows from the flip-flop 282, through conductor 298 and the coils 300 and 302 to ground point 320. The rotor 324 of the stepper motor 288 therefore rotates from its position in alignment with poles 296 into alignment with poles 304.

By following this same type of analysis, it can be seen that the stepper motor will follow along with the progress of the spot 238 on the oscilloscope tube face as long as the drift rate of the spot is not too great. The servo motor 214 of the frequency comparator of FIGURE 2 and the stepper motor 288 of the phase comparator of FIGURE 3 are connected to the frequency control of the power oscillator 74 through the differential gearing mechanism 70 so that their contributions to control are additive. When the frequency difference is appreciable, the frequency comparator system operates effectively while the output of the phase comparator system is quite random in nature and, therefore, ineffective. As the frequency of the signals from the tone wheel approaches the frequency of the signals from the precision oscillator, the frequency comparator system becomes quite insensitive whereas the drift rate of the spot 238 becomes quite low thereby allowing the phase comparator system to take over control.

As an aid to a fuller understanding of the servo system of FIG. 1, an example of the operation thereof will now be presented.

*System operation*

Assume, as a first example, that the shaft 2 is normally rotating at a speed of 1200 r.p.m. and that it is desired to increase the output shaft speed to 1800 r.p.m. and hold it constant at this value. The operator manually sets a counter 6 to indicate the desired speed. In doing so, the wiper arm 18 on the potentiometer 16 is repositioned through a mechanical linkage 8 connecting it to the counter 6, thereby temporarily unbalancing the bridge comparator 12. A voltage signal is therefore impressed on the input to the amplifier 20 so as to cause the servo motor 26 to be energized. At the instant that the change in the desired speed is made, the position of wiper arm 31 on potentiometer 15 corresponds to the position of the friction drive member 38 when the output shaft speed is 1200 r.p.m. Stated somewhat differently, friction drive member 38, at the instant the change is made, is radially displaced from the axis of rotation of the driving disc 42 by a distance which causes the driven cylinder 44 to rotate at such a speed as to cause the output shaft 2 of the differential gearing mechanism 48 to rotate at 1200 r.p.m. The application of the error signal appearing at the output of the bridge to the motor 26 is effective to produce a torque on the motor shaft 28. Shaft 28, being coupled to the friction drive member 38 through mechanical linkage 36, effects a repositioning of this member on the surface of the driving disc 42 so as to increase the rotational velocity of the driven cylinder member 44. The turning of motor shaft 28 is also effective, through mechanical linkage 30, to change the position of the wiper arm 31 on potentiometer 15 in a direction to rebalance the bridge. The shaft 28 of motor 26 therefore continues to rotate and reposition the friction drive member 38 until the bridge is again rebalanced at which time motor 26 is no longer energized. When the wiper arms 18 and 31 approach positional correspondence, friction drive member 38 will be in such a position so as to cause the driven cylinder member 44 to rotate at such a speed that the output shaft 2 from the differential gearing mechanism 48 rotates within a few revolutions per minute of the new desired speed of 1800 r.p.m. Thus it can be seen that the open loop portion of the system of FIG. 1 is effective to cause the output shaft to rotate at a speed quite close to the new desired speed.

In order to provide a fine or vernier control over the output shaft speed, a closed feedback loop is also included in the system of FIG. 1. When the operator enters the new desired speed into the counter 6 there is effected through the mechanical linkage 13 a change in the frequency of oscillation of the precision oscillator 14. Precision oscillator 14 is made to oscillate at a frequency proportional to the new desired speed. This signal, whose frequency is proportional to the new desired speed, is applied to a first input terminal 52 of the frequency and phase comparator network 54 which has already been described. At this same instant, since output shaft 2 is initially rotating at a speed of 1200 r.p.m., a signal whose frequency is proportional to 1200 r.p.m. will be developed by means of the tone wheel photocell pickup arrangement and applied to the second input terminal 56 of the frequency and phase comparator 54. Since the two signals applied to comparator 54 are greatly different from one another in frequency at the moment the change is made, the frequency comparator of FIG. 2 produces an output in the manner previously described so as to effect a rotation of the shaft 66. Two signals of a different frequency cannot be compared on a phase basis and, hence, the phase comparator of FIG. 3, at this time, produces a random rotation of its stepper motor shaft 68. These two shafts are coupled through differential gearing means 70 such that the output shaft 72 thereof revolves primarily as a function of the rotation of the input shaft 66 alone. The shaft 72 of differential gearing means 70 is connected to the frequency control of a power oscillator 74. Oscillator 74 is adjustable in frequency within a limited range about a center frequency. For example, oscillator 74 may normally oscillate at a frequency of 60 cycles per second, but be continuously variable in a frequency range of from 55 cycles per second to 65 cycles per second. In other words, motor 74 is capable of producing only a small percentage change in the oscillation frequency of the oscillator 74.

The output from the power oscillator is applied through conductor 76 to the amature winding of a synchronous drive motor 78 whose field winding is excited by a constant direct current voltage. As is well known in the art, the shaft speed of a synchronous motor is directly proportional to the frequency of the signal applied to its armature windings. For example, if the motor 78 is a four-pole machine, the speed of shaft 80 will be continuously variable in the range between 1650 r.p.m. and 1950 r.p.m. corresponding to an applied frequency of 55 cycles per second and 65 cycles per second, respectively.

Since at the instant that the change in the desired speed is made the error signal appearing on line 66 is large, it may be assumed that the power oscillator generates signals of a frequency of 65 cycles per second. The shaft 80 of motor 78 is therefore rotating at a higher than normal speed of 1950 r.p.m. Because shaft 80 is mechanically coupled to the input shaft 84 of the differential gearing mechanism 48 by means of mechanical linkage 82, the increase of the speed of the shaft 80 causes a corresponding increase in the speed of the output shaft 2. The actual increase in the speed of shaft 2 is, of course, dependent on the gear ratios involved in the differential gearing mechanism 48. Since the synchronous drive motor 78 is also used to rotate the driving disc 42 through the mechanical linkage 86 and the gear train 88, the speed at which driven cylinder member 44 rotates is also increased. Because member 44 is mechanically coupled to a second input shaft on the differential gearing mechanism 48, the change in the speed of said member also contributes to the effect of increasing the speed of the output shaft 2.

As the actual speed of shaft 2 approaches the assumed desired speed of 1800 revolutions per minute, the frequency of the signal produced by means of the tone wheel 58 and the phototube, arrangement 60 approaches that of the precision oscillator 14. As mentioned earlier in the description of the frequency comparator network of FIG. 2, when the frequency difference between the two signals being compared is small, the frequency comparator loses sensitivity. As a result, the voltage developed across the control winding 210 of motor 212 becomes too small to effect a rotation of the shaft 66. Since the frequency difference is now small, the phase comparator of FIG. 3 is effective to produce a rotation of the shaft 68 in the manner already described. The rotation of shaft 68, acting through the differential gearing mechanism 70, causes shaft 72 thereof to turn in a direction to further change the frequency of power oscillator 74. The effect of this change in frequency is to cause the speed of the output shaft 80 of motor 78 to correspondingly change.

Since the speed of the output shaft 2 is controlled to a greater extent by the action of the variable speed control device 40, which in turn is controlled through the open feedback loop, and only slightly effected by means of the synchronous drive motor, the closed feedback loop including synchronous drive motor 79 acts as a fine or vernier control over the output shaft speed.

While I have described a specific embodiment of my invention it should be understood that the invention is in no sense limited thereto except as set forth in the appended claims.

I claim:

1. In a control system, the combination comprising: means for generating first signals of a frequency proportional to the desired speed of an output shaft; means associated with said output shaft for generating second signals of a frequency proportional to the actual speed of said shaft; circuit means for comparing said first and second signals and for producing a first error signal proportional to the difference in frequency between said first and second signals; circuit means for comparing the phase between said first and second signals when said first error signal is small and for producing a second error signal proportional to the difference in phase between said first and second signals; means responsive to said first and second error signals for controlling the frequency of power oscillator means; and synchronous motor means connected to said power oscillator means for driving said output shaft, the arrangement being such that said first and said signals tend to assume a predetermined frequency relationship.

2. In a control system for maintaining the angular velocity of an output shaft constant at a predetermined value, the combination comprising: first oscillator means for generating first signals of a frequency proportional to the desired speed of an output shaft; a rotating reticle having indicia contained thereon coupled to said output shaft; photoelectric means associated with said reticle for generating second signals of a frequency proportional to the actual speed of said shaft; frequency comparator means responsive to said first and second signals for producing a first error signal proportional to the difference in frequency between said first and second signals; phase comparator means responsive to said first and second signals when said difference in frequency is small for producing a second error signal proportional to the difference in phase between said first and second signals; means responsive to said first and second error signals for controlling the frequency of power oscillator means; and motor means connected to said power oscillator means; and motor means connected to said power oscillator means for driving said output shaft through gearing means, the arrangement being such that said first and second signals tend to assume a predetermined frequency relationship.

3. In a speed control servo system the combination comprising: means for generating a voltage proportional to the desired speed of load means; means responsive to said voltage for controlling the speed of said load means such that the speed of said load means is approximately said desired speed; and further means comprising means for generating feedback signals proportional to the actual speed of said load means; means for comparing said feedback signals to a signal proportional to said desired speed comprising a common resistive path but separate capacitance paths in series with the resistive path controlled individually by said feedback and desired speed signals; and means responsive to the output of said comparison means for further controlling the speed of said load means such that speed of said load means more closely approximates said desired speed.

4. In a speed control servo system, the combination comprising: an output shaft, the speed of which is to be maintained constant at a desired value; first and second variable speed driving means coupled to said shaft; means for developing a first signal proportional in frequency to the desired speed of said shaft; means for developing a second signal proportional in frequency to the actual speed of said shaft; means for comparing said first and second signals and for developing an error signal proportional in frequency to the difference in frequency between said first and second signals; means for applying said error signal to said first variable speed drive means; means for developing a voltage, the amplitude of which is proportional to the desired speed of said output shaft; means including said second variable speed driving means responsive to said voltage for controlling the speed of said output shaft; and feedback means connected to said second driving means for effecting a reduction of the amplitude of said voltage as said output shaft approaches said desired speed.

5. In a speed control servo system, the combination comprising: means for generating a voltage proportional to the desired speed of load means; motor means responsive to said voltage for controlling variable speed control means controlling the speed of said load means such that the speed of said load means approaches said desired speed; and further means comprising means for generating feedback signals of a frequency proportional to the actual speed of said load means; oscillator means for generating signals of a frequency proportional to said desired speed of said load means; comparison means for comparing said feedback signals to said signals from said oscillator means; and means including said control means responsive to the output of said comparison means for further controlling the speed of said load means such that said speed of said load means tends to become equal to said desired speed.

6. In a speed control servo system the combination comprising: means for generating a voltage proportional to the desired speed of an output shaft; ball-disc variable speed drive means including a driving disc, friction drive means engaged with said disc, and cylinder means driven by said drive means; first motor means responsive to said voltage for positioning said friction drive means on said driving disc thereby controlling the speed of said driven cylinder member; differential gearing means having at least two input shafts and said output shaft; means connecting said cylinder member to one of said input shafts; means associated with said output shaft for generating feedback signals of a frequency proportional to the actual speed of said output shaft; oscillator means for generating signals of a frequency proportional to said desired output shaft speed; frequency comparison means for comparing said feedback signal with said oscillator signals; means responsive to the output signals from said comparison means for controlling the speed of second motor means; and means connecting said second motor means to said driving disc and to another of said input shafts such that the actual speed of said output shaft tends to become equal to said desired speed.

7. In a speed control servo system, the combination comprising: means for generating a first voltage proportional to the desired speed of an output shaft; motor means responsive to said first voltage for positioning drive means with respect to a driving disc thereby controlling the speed of a cylinder member frictionally engaged with said drive means; feedback means including means for producing a second voltage proportional to the position of said drive means; means for comparing said second voltage with said first voltage and producing a signal proportional to the difference between said voltages; means for applying said signal to said motor means such that said difference is minimized; differential gearing means having at least two input shafts and said output shaft; means connecting said cylinder member to one of said input shafts; means associated with said output shaft for generating feedback signals of a frequency proportional to the actual speed of said output shaft; oscillator means for generating signals of a frequency proportional to said desired output shaft speed; frequency comparison means for comparing said feedback signal with said oscillator signals; means responsive to the output signals from said comparison means for controlling the speed of second motor means; and means connecting said second motor means to said driving disc and to another of said input shafts such that the actual speed of said output shaft tends to become equal to said desired speed.

8. In a speed control servo system the combination comprising: coarse control circuit means and fine control circuit means; said coarse control circuit including means for developing a voltage proportional to the desired speed of an output shaft, first motor means responsive to said voltage developing means, means coupled to the rotor of said motor means for changing the radial position of friction drive means on the surface of a driving disc thereby varying the speed of a cylinder member frictionally engaged with said drive means, feedback means for said motor means, differential gearing having a first and second input shafts and said output shaft, and means coupling said cylinder member to said first input shaft; and said fine control circuit means including signal generating means coupled to said output shaft for generating first signals of a frequency proportional to the actual speed of said output shaft, means for generating second signals of a frequency proportional to said desired speed, frequency comparison means for generating a first error signal proportional to the difference between said actual frequency and said desired frequency, phase comparison means responsive to said first and second signals when said first error signal is small for producing a second error signal proportional to the difference in phase between said first and second signals, means responsive to said first and second error signals from said comparison means to control the speed of second motor means, and means coupling the rotor of said second motor means to said driving disc and to said second input shaft.

9. In a speed control servo system the combination comprising: potentiometer means for establishing a voltage proportional to the desired speed of an output shaft; first motor means responsive to said voltage for radially positioning friction drive means on a driving disc thereby controlling the speed of a driven cylinder member; differential gearing means having a plurality of input shafts and an output shaft; means connecting said driven cylinder member to one of said plurality of input shafts; photoelectric means associated with said output shaft for generating feedback signals of a frequency proportional to the actual speed of said output shaft; first oscillator means for generating signals of a frequency proportioal to said desired output shaft speed; frequency comparison means and phase comparison means for comparing said feedback signal with said oscillator signals; second motor means responsive to the output from said comparison means for controlling the frequency of second oscillator means; synchronous motor means responsive to the output of said second oscillator means; and means coupling the rotor of said synchronous motor to said driving disc and to another of said plurality of input shafts such that said output shaft speed tends to equal said desired speed.

10. A speed control servo system having an output member to be maintained at a constant predetermined speed; reference voltage means; means for rendering the frequency of said reference voltage means dependent on the desired predetermined speed; means for driving a voltage proportional in frequency to the actual speed of said output member; means for deriving a bias voltage proportional in magnitude and polarity to the difference in frequency between said reference voltage means and said voltage proportional in frequency to the actual speed; modulator means responsive to said bias voltage; first motor means connected to the output of said modulator means, means for deriving signals corresponding to the phase difference between said reference voltage and said voltage proportional to the actual speed when said bias voltage is small; means responsive to said signals for effecting a rotation of second motor means; differential gearing means connected to the shafts of said first and second motor means; power oscillator means connected to the output shaft of said differential gearing means such that the frequency of said power oscillator means is adjusted in accordance with the rotation of said output shaft; and third motor means connected to the output of said power oscillator means for driving said output member through second differential gearing means, the arrangement being such that said output member is maintained at the desired speed.

11. In a speed control servosystem, the combination comprising: open loop means adjusting variable speed control means controlling the speed of load means such that the speed of said load means approaches or approximate a desired speed; further means comprising means controlled by the load means for generating feedback signals of a frequency proportional to the actual speed of said load means; oscillator means for generating signals of a frequency proportional to said desired speed of said load means; comparison means for comparing said feedback signals to said signals from said socillator means; and means including said variable speed control means responsive to the output of said comparison means for further controlling the speed of said load means such that said speed of said load means tends to become equal to said desired speed.

12. In a speed control servosystem, the combination comprising: open loop means adjusting variable speed control means controlling the speed of load means such that the speed of said load means approaches a desired speed; further means comprising means controlled by the load means for generating feedback signals of a frequency proportional to the actual speed of said load means; oscillator means set up concurrently with said open loop means for generating signals of a frequency proportional to said desired speed of said load means; closed loop means including comparison means for comparing said feedback signals to said signals from said oscillator means; and means in said closed loop means responsive to the output of said comparison means for further controlling the speed of said load means such that said speed of said load means tends to become equal to said desired speed.

13. In a speed control servosystem, the combination comprising: an output member, the speed of which is to be maintained substantially constant at a preset value; first signal generating means generating signals having a frequency proportional to the speed of said output member; second signal generating means generating signals having a frequency proportional to said preset value; signal comparison means for producing signals proportional to the difference in frequency between said first and second signal generating means comprising a pair of impedance paths controlled individually by said first and second signals, said paths having a common impedance element but separate frequency sensitive elements; driving means for said output member; and means responsive to the output from said comparison means varying the speed of said driving means such that the signals from said first and second signal generating means tend to become of equal frequency.

References Cited by the Examiner

UNITED STATES PATENTS

| 2,627,596 | 2/1953 | Andrews | 318—171 |
| 2,817,800 | 12/1957 | Schroeder | 318—314 |
| 2,866,143 | 12/1958 | Maxwell | 318—314 |
| 2,932,778 | 4/1960 | Curtis | 318—314 |
| 3,089,061 | 5/1963 | Nieuweboer | 318—318 X |
| 3,110,853 | 11/1963 | Jones | 318—318 X |

ORIS L. RADER, *Primary Examiner.*

MILTON O. HIRSHFIELD, *Examiner.*